(12) United States Patent
Nordin

(10) Patent No.: US 7,994,929 B2
(45) Date of Patent: Aug. 9, 2011

(54) POWER PATCH PANEL WITH GUIDED MAC CAPABILITY

(75) Inventor: Ronald A. Nordin, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/848,541

(22) Filed: Aug. 2, 2010

(65) Prior Publication Data

US 2010/0295553 A1    Nov. 25, 2010

Related U.S. Application Data

(63) Continuation of application No. 11/564,625, filed on Nov. 29, 2006, now Pat. No. 7,768,418.

(60) Provisional application No. 60/742,533, filed on Dec. 6, 2005.

(51) Int. Cl.
*G08B 21/00* (2006.01)

(52) U.S. Cl. .................... 340/635; 340/653; 340/657

(58) Field of Classification Search .................. 340/687, 340/686.4
See application file for complete search history.

(56) References Cited

U.S. PATENT DOCUMENTS

| | | | | | |
|---|---|---|---|---|---|
| 3,757,323 | A | * | 9/1973 | Pintell | 340/509 |
| 7,314,392 | B2 | * | 1/2008 | Pharn et al. | 439/676 |
| 2007/0264862 | A1 | * | 11/2007 | Hallberg | 439/489 |

* cited by examiner

*Primary Examiner* — Travis R Hunnings
(74) *Attorney, Agent, or Firm* — Robert A. McCann; Christopher S. Clancy; Christopher K. Marlow

(57) ABSTRACT

A method and apparatus are provided for incorporating guided network cable Move/Add/Change (MAC) work order capability into a power patch panel. MAC work orders may be controlled and monitored using in-band signaling using, e.g., standard RJ-45 patch cords. Cable detection is performed at a port level on a real-time basis. Coordination of guided MAC operations may be performed by the patch panel, independently, or in conjunction with, or under the control of, a remote Network Management System. The patch panel may be in either an interconnect or cross-connect configuration.

14 Claims, 3 Drawing Sheets

POWER PATCH PANEL WITH GUIDED MAC CAPABILITY

RELATED APPLICATIONS

This application is a continuation of U.S. patent application Ser. No. 11/564,625, filed Nov. 29, 2006, now U.S. Pat. No. 7,768,418, which claims the benefit of priority to U.S. Provisional Patent Application Ser. No. 60/742,533, filed Dec. 6, 2005, entitled "Power Patch Panel With Guided MAC Capability," which is herein incorporated by reference in its entirety.

BACKGROUND

1. Field of Invention

The present invention pertains to network cable management.

2. Description of Related Art

Communications networks are growing in number and complexity. Human error associated with the implementation and maintenance of physical cable connections between network communication equipment can result in significant negative impact to a network. Such negative impact can be avoided through improved control and verification of network cable Move/Add/Change orders implemented by network technicians.

SUMMARY

A method and apparatus are described that provides automated guidance to technicians assigned the task of implementing network cable Move/Add/Change (MAC) work orders. The approach allows implementation of MAC work orders implemented by technical personnel to be guided and verified using in-band (e.g. Ethernet, etc.) signaling over standard network cables (e.g., Cat-5, etc.) rather than out-of-band techniques that require the use of network cables with additional cable conductors. For example, the described guided MAC capability may be used to guide and verify port connections established using standard RJ45 patch cords. The described approach is compatible with interconnect and/or cross-connect applications.

BRIEF DESCRIPTION OF THE DRAWINGS

Exemplary embodiments are described below with reference to the attached drawings, in which like reference numerals designate like components.

DETAILED DESCRIPTION OF EMBODIMENTS

Figure 1:
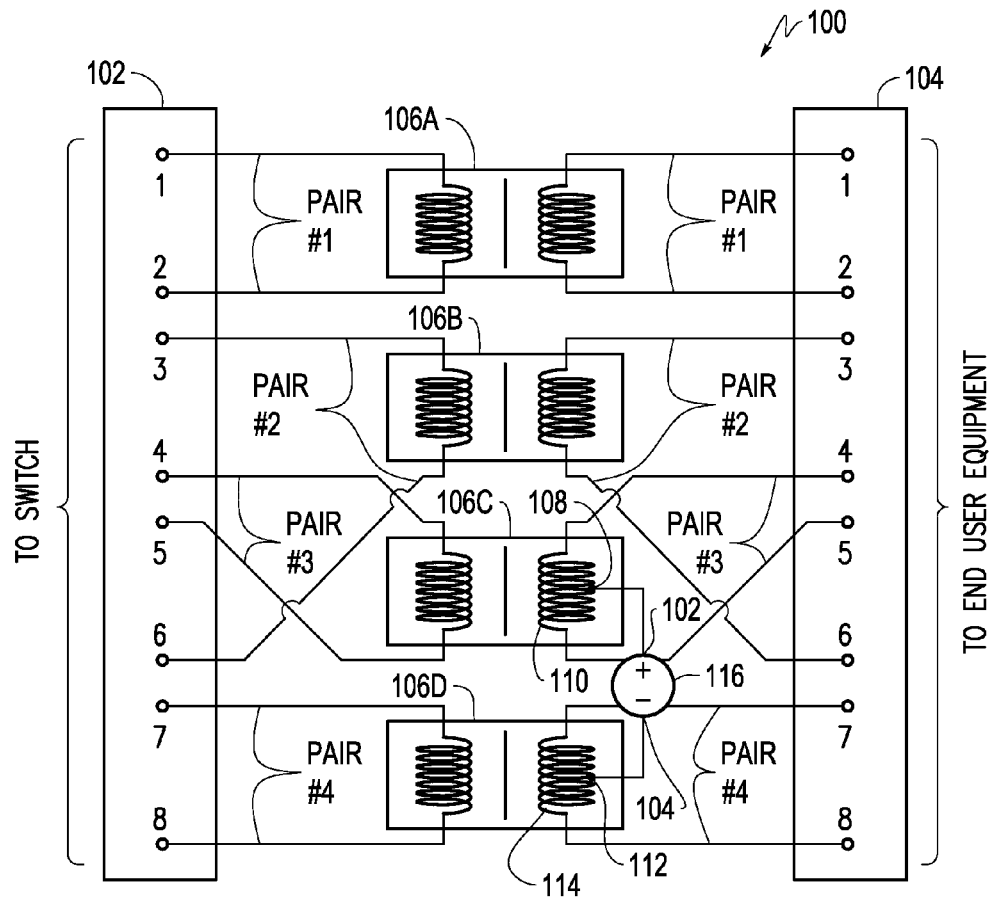
FIG. 1 is a schematic diagram of an exemplary port that supports cable connection monitoring using in-band connection monitoring techniques.

Challenges associated with incorporating guided Move/Add/Change (MAC) capabilities into a communication device include: 1) indicating, to a technician assigned to implement a MAC work order, which ports to disconnect and/or connect; 2) determining when a network cable or patch cord is plugged into a port; 3) verifying that the MAC work order has been properly executed; and 4) relaying corrective action to the technician in the event of an incorrectly implemented MAC work order.

Port Level MAC Visual Guides—

In interconnect applications, one end of a patch cord may terminate at a communication switch port and a second end of the patch cord may terminate at a patch panel port. Several alternatives may be used to indicate to a technician, who has been assigned to execute a MAC work order, which ports to connect and/or disconnect.

On the power patch panel side of the network cable connection, lights associated with, or built into, a patch panel port may be illuminated to instruct a technician whether to connect or disconnect a cable from the illuminated patch panel port. However, difficulty may arise with respect to identifying the corresponding port on the communication switch side. Therefore a power patch panel that supports guided MAC would preferably be compatible with a wide range of communication switch, port-level indicator techniques, including:

1. MAC Port Indicator Appliqués—MAC port indicator appliqués are port overlays (e.g., a flex circuit attached with adhesive) that attach over, or proximate to, a port on a communication switch, or other network device, that supports MAC LED, LCD, or other port indicators.
2. MAC Communication Interface—A MAC communication interface may allow an external device, such as a power patch panel or Network Management System, to communicate with a switch or other network device in order to activate the port LED or LCD integrated within the network device in support of MAC operations.
3. External Display Interface—An external display interface (e.g., a Network Management System MAC display on a portable computer) may allow a technician to view a schematic or logical representation of a communication device and port affected by a MAC work order.

In an exemplary power patch panel embodiment that supports guided MAC capabilities between the power patch panel and a network device equipped with a MAC port indicator appliqués, the power patch panel may support a communication interface (e.g., an Ethernet connection) to the appliqué that allows the power patch panel to activate and/or deactivate the indicators on the appliqué in accordance with MAC work orders orchestrated by the power patch panel. Alternatively, the appliqué may be configured with a simple latching multiplexor that interconnects to the LEDs of the appliqué and that supports a direct communication interface to the power patch panel. Such a direct communication interface between the power patch panel and the appliqué may support communication between the power patch panel and the appliqué in any manner. For example, the power patch panel and the appliqué may communicate over unused Ethernet pairs within a standard Ethernet cable, over additional conductors included in a non-standard cable (e.g., a cable with five wire pairs and a 10-pin connector), or a low frequency signal, e.g., an AC signal, superimposed over the signals conducted through the conductors.

In an exemplary patch panel embodiment that supports guided MAC capabilities between the power patch panel and a network device equipped with a MAC communication interface, the power patch panel may support the communication interface (e.g., an Ethernet connection) of the network device that allows the power patch panel to activate and/or deactivate port-level indicators integrated within the device in accordance with MAC work orders orchestrated via the power patch panel. Such an approach may require development and widespread adoption of a standard MAC interface, and/or coordination with specific vendors to persuade them to adopt/adapt the standard interface to operate with their communication device, or coordination with specific vendors to develop a physical connection interface and logical control interface that may support such guided MAC operations.

In an exemplary patch panel embodiment that supports guided MAC capabilities between the power patch panel and a network device using an external display, the power patch panel may support a communication interface (e.g., an Ethernet connection) to an external display that activates visual indicators on the display to identify communication equipment and specific ports associated with a MAC work order. Alternatively, the power patch panel may communicate MAC port information via a network connection to a Network Management System that communicates the updated MAC information to the external display.

Physical Patch Cord Detection Techniques—

Detecting the physical connection of a patch cord to a port (e.g., a port within the power patch panel, a port on an appliqué, or a port on another network device) may include any of the following techniques, alone or in any combination:

1. Detecting the presence of a standard or vendor proprietary Power over Ethernet (POE) device using POE detection techniques. For example, the power patch panel may initiate detection of a device using standard or vendor proprietary POE device detection techniques to determine whether a POE device is connected to the opposite end of a cable. If a POE device is detected, the power patch panel may determine that the port is occupied. To be successful, however, such an approach requires that both ends of the cable be connected and that the connected port, or device, support a POE detection technique.
2. Detecting the presence, or absence, of a cable using physical cable detection techniques such as mechanical detents, magnetic detents, optical detectors, and/or other mechanical/physical techniques that have been integrated, in advance, into the design of the communication port or appliqué.
3. Detecting a network cable's magnetic/capacitive coupling. Such an approach may use enhanced common mode detection techniques to detect a coupling between the two pairs at a given optimum frequency (e.g., at 100 MHz).

As described in greater detail below, a power patch panel design may integrate any, or any combination, of the above techniques to implement a guided MAC power patch panel system. For example, a power patch panel that supports guided MAC operations may support guided MAC work order implementation and verification of cable connections between the power patch panel and a wide range of network devices. For example, the power patch panel may communicate with one or more network devices equipped with MAC port indicator appliqués, one or more network devices that support an integrated MAC communication interface and/or network devices that support communication either directly, or via a Network Management System, with a wide variety of external display devices.

Further, as described in greater detail below, the described power patch panel may integrate any, or any combination, of the above techniques to detect the presence, or absence, of cable connections on any or all of the power patch panel ports. For example, for any individual port, a power patch panel may use any combination of POE detection techniques, physical detection techniques, and/or magnetic or capacitive coupling techniques, as described above.

Any type of visual indicator may be used by the power patch panel and/or the network devices and/or appliqué device with which the power patch panel communicates in support of guided MAC operations. For example, a power patch panel may activate LEDs associated with a port on the power patch panel or any other device with which the power patch panel coordinates guided MAC operations. Assuming that three different colored LEDs are associated with each port, and assuming that each LED supports a range of flash rates, a power patch panel may control the LEDs to identify a port, as well as to convey an instruction code to the technician. For example, instructions such as "disconnect" or "connect," as well as a status code such as "incorrect" or "correct," may be provided to a technician using different combinations of colored lights and flash rates.

In a simplex system, the power patch panel may illuminate the LEDs associated with a port on the power patch panel or other network device for a period of time and assume, without the use of detection techniques, that the patch cord was either inserted or removed in accordance with the LED code displayed. Assuming that two power patch panels that support such a simplex guided MAC capability are used in a cross-connect configuration, both ports associated with a MAC work order may be displayed to the technician for a period of time. After this period of time, the power patch panel(s) may initiate a network scan and map out the interconnect to verify that the MAC work order has been implemented correctly. Should the network scan indicate that the MAC work order was implemented improperly, the power patch panel may indicate corrective action, or re-display the original MAC work order, via the LEDs.

Connection scanning and methods for guiding MAC operations, as described above, may be coordinated by logic and control software included within the power patch panel. If guided MAC operations are coordinated by the power patch panel directly (e.g., via an integrated power patch panel controller), the power patch panel controller may include software or firmware based logic that supports the variety of physical interfaces and logical interfaces described above.

Alternatively, the power patch panel may communicate with a Network Management System that has connectivity to the respective devices associated with the MAC work order and request that the Network Management System verify that the correct ports have been connected or disconnected in accordance with the MAC work order. Based upon the results returned by the Network Management System, the power patch panel may display a results message to the technician via the respective port level indicators to indicate that the change has been implemented correctly or incorrectly, or to indicate corrective measures (such as displaying a disconnect message on a port into which a cable has been incorrectly inserted).

In some embodiments, guided MAC operations may be controlled by logic and controls implemented by a Network Management System. In such an embodiment, the power patch panel may support execution of guided MAC instructions received from the Network Management System by controlling port level visual indicators (as described above) and reporting port level physical cable connection/disconnect information. If guided MAC operations are controlled by a Network Management System, physical and logical interfaces to each of the respective LED displays (e.g., appliqués with integrated port LEDs, etc.) may be controlled by the Network Management System and related network infrastructure.

FIG. 1 is a schematic diagram of an exemplary port that supports physical connection monitoring using in-band connection monitoring techniques. As shown in FIG. 1, exemplary port 100 may include a first cable interconnect 102 and a second cable interconnect 104. Cable interconnect 102 and cable interconnect 104 each represent a physical interface at which one cable (e.g., CAT-5, unshielded twisted pair, etc.) may attach to port 100.

As depicted in FIG. 1, exemplary port 100 may be configured to support a connection between two eight-conductor (i.e., four wire pair) cables. In such an embodiment, cable interconnects 102 and 104 each provide a physical connection point for each of the four wire pairs associated with each of the cables connected to port 100. However, exemplary port 100 and exemplary cable interconnects 102 and 104 may be configured to support a cable with any number of conductors, and are not limited to providing connectivity between two four-pair conductor cables as shown in FIG. 1.

As further depicted in FIG. 1, an electrical signal path may be established between corresponding wire pairs associated with each of the respective cables terminated at cable interconnects 102 and 104 by transformers 106A-D, respectively. For example, in FIG. 1, transformer 106A provides electrical signal connectivity between conductors 1 and 2 (i.e., wire pair #1) in the cables that terminate at cable interconnect 102 and 104, respectively. Similarly, transformer 106B provides electrical signal connectivity between conductors 3 and 6 (i.e., wire pair #2); transformer 106C provides electrical signal connectivity between conductors 4 and 5 (i.e., wire pair #3); and, transformer 106D provides electrical signal connectivity between conductors 7 and 8 (i.e., wire pair #4). Transformers 106A-D relay signals between the respective conductor pairs terminated at each of cable interconnects 102 and 104, while filtering out low frequency signals.

Exemplary port 100 may include cable detection circuitry 116 to provide cable detection capability based upon a variety of cable detection techniques. For example, as shown in FIG. 1, node 102 of detection circuit 116 may be attached to a center tap 108 of a coil 110 of wire-pair transformer 106C. Further node 104 of detection circuit 116 may be connected to a center tap 112 of a coil 114 of wire-pair transformer 106D. Such a placement of detection circuitry within port 100 is exemplary only. Depending upon the nature of the detection circuit, detection circuitry may be placed at other locations within port 100, as described below with respect to FIG. 4.

Figure 2:
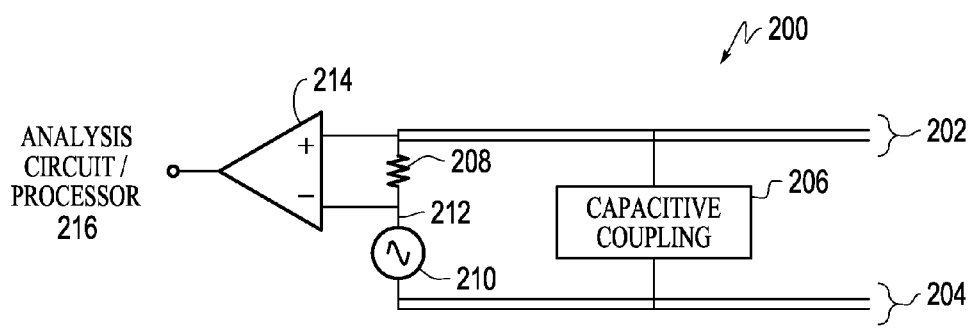
FIG. 2 is a schematic diagram of an exemplary detection circuit that may be used to detect the presence, or absence, of a physical cable connection to the exemplary port shown in FIG. 1.

FIG. 2 is a schematic diagram of an exemplary cable detection circuit 200 that may be used to support cable connection monitoring at a port (e.g., as shown in FIG. 1 at 116) using in-band connection monitoring techniques. As shown in FIG. 2, exemplary cable detection circuit 200 may include a capacitive coupling 206 (or other frequency dependent impedance) in parallel with a resistor 208 and a signal source 210. As further shown in FIG. 2, an operational amplifier circuit 214 may be placed in parallel with resistor 208, whereas node 202 and node 212 (i.e., between resistor 208 and signal source 210) serve as inputs to operational amplifier circuit 214. Output of operational amplifier circuit 214 may be passed to analysis circuit or processor 216.

In operation, detection circuit 200 may be connected to a port as shown at 116 in FIG. 1. For example, node 202 of detection circuit 200 (FIG. 2) may connect to node 102 in FIG. 1, and node 204 of detection circuit 200 may connect to node 104 in FIG. 1. Configured in such a manner, the circuit described in FIG. 2 may detect changes in voltage across capacitive coupling 206, and hence, resistor 208, in response to changes in the resistive load placed across nodes 202 and 204 (i.e., in response to changes in the resistive load between node 102 and node 104 shown in FIG. 1).

For example, when no cable is attached to cable interconnect 102 in a port monitored by the exemplary circuit shown in FIG. 2, the voltage across resistor 208 in response to a signal output by AC signal source 210 will result in a recordable voltage value. Assuming that signal source 210 generates a signal at 100 MHz and the capacitive coupling between nodes 202 and 204 is 10 pF, or 10 nH, respectively, the magnitude of impedance across capacitive coupling 206 may be approximately 160 ohms and 6 ohms, respectively. Such an impedance will result in a voltage across resistor 208, the magnitude of which may be determined by operational amplifier circuit 214 and relayed to analysis circuit/processor 216 for storage.

Upon connection of a cable to an exemplary port 100 monitored by the exemplary circuit shown in FIG. 2, a resistive load will be introduced between nodes 202 and node 204. That resistive load represents the capacitive coupling between the wire pairs to which each of nodes 202 and 204 are connected, respectively. Based upon the voltage divider rule, the voltage across resistor 208 will necessarily change in response to a change in the resistive load placed across nodes 202 and 204. This change in voltage may be detectable by operational amplifier circuit 214, the output of which may be reported to analysis circuit/processor 216. Based upon a comparison of previously stored values, analysis circuit/processor 216 may determine whether a cable has been connected to, or disconnected from, the port. Further, because the resistive load across capacitive coupling 206 may vary in response to a cable being connected to, or disconnected from, cable interconnect 102, cable interconnect 104, or both, a single circuit may be used to monitor the connection status of both cable interconnects.

A port, as shown in FIG. 1, that is equipped with common mode cable detection circuitry as shown in FIG. 2 may be used to detect changes in connectivity at both cable interconnect 102 and cable interconnect 104 based upon common mode based analysis techniques. A voltage across resistor 208 may change in response to a change in the resistive load placed upon capacitive coupling 206. Depending upon the frequency of the signal applied to detection circuit 200, the voltage across resistor 208 may change in response to connection or disconnection of a cable at cable interconnect 102 as well as a cable disconnect or disconnect at cable interconnect 104. For example, assuming a signal of 100 MHz is used in detection circuit 200, analysis circuit/processor 216 may periodically initiate AC signal source 210 and take readings of the output generated by operational amplifier circuit 214. The output of operational amplifier circuit 214 may be recorded for future use by analysis circuit/processor 216 and/or may be used to determine a current status of the connection based, for example, on a comparison of the currently measured value with one or more previously stored values.

Operational amplifier circuit 214, as depicted in FIG. 2, may be configured to notify the analysis circuit/processor 216 upon detecting a change of the capacitive coupling within the port. In this manner, operational amplifier circuit 214 supports the real-time monitoring of cable connectivity. Upon receipt of the new value from operational amplifier circuit 214, analysis circuit/processor 216 may determine the nature of the change that has occurred based upon a comparison of the newly received value with previously recorded values and/or predetermined threshold values that are associated with specific physical cable connection configurations.

Figure 3:
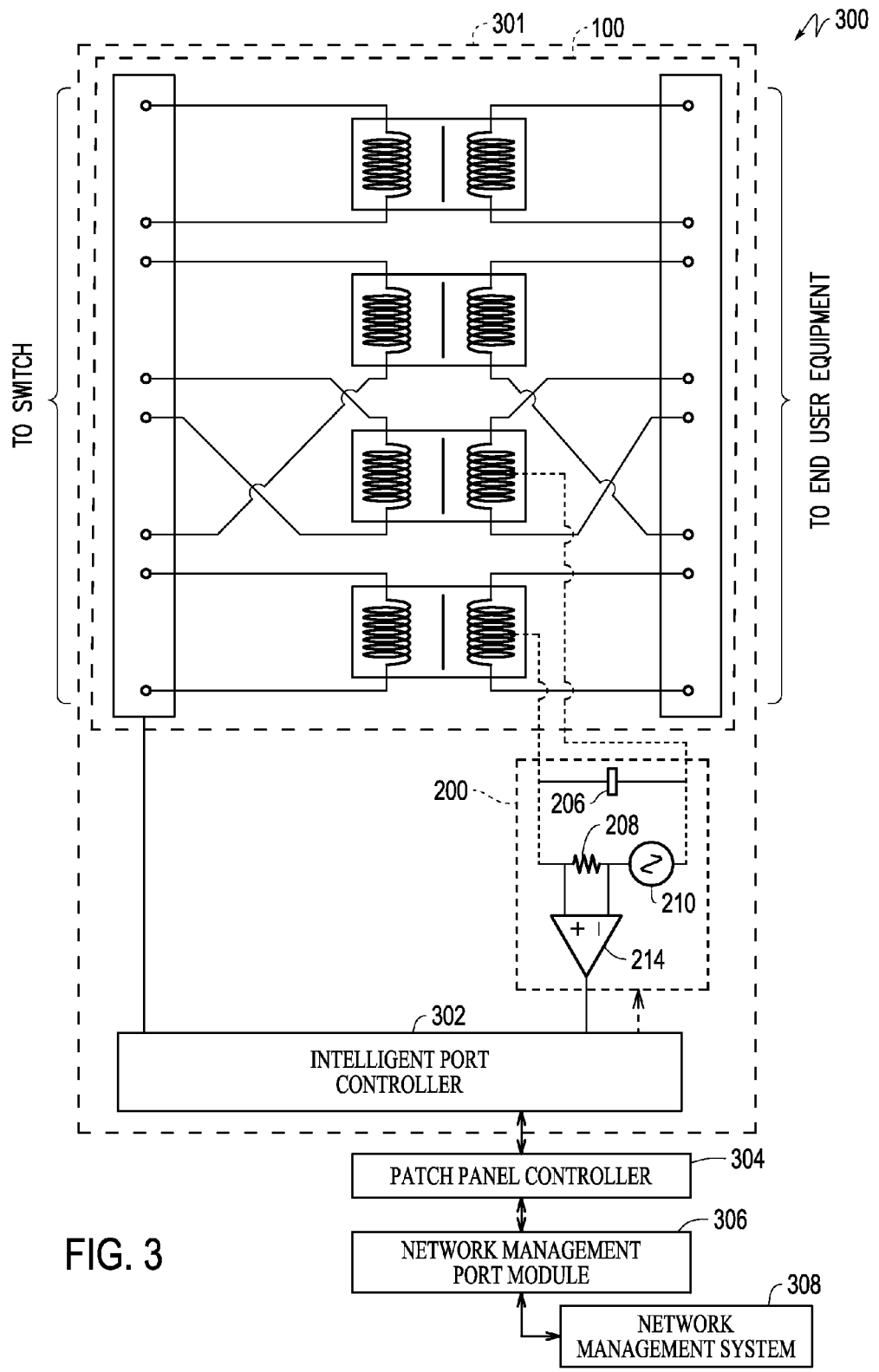
FIG. 3 is a schematic diagram of an exemplary power patch panel that supports guided MAC operations and is capable of monitoring the presence, or absence, of a physical cable connection to a port using in-band connection monitoring techniques.

FIG. 3 is an exemplary embodiment of a power patch panel capable of monitoring the presence or absence of physical cables connected to the respective ports of the power patch panel using in-band connection monitoring techniques. As shown in FIG. 3, power patch panel 300 may include exemplary port 100 and may include exemplary common mode cable detection circuitry 200 as described above with respect to FIG. 2. In FIG. 3, analysis circuit/processor 216 shown in FIG. 2 has been replaced with intelligent port controller 302. In such a configuration, intelligent port 301 is capable of monitoring and detecting changes in cable connectivity, as described above. For example, by initiating signal source 210, intelligent port controller 302 may record a measured voltage value across resistor 208. By storing values and comparing subsequent voltage readings in response to periodic updates or in response to an update request from patch panel controller 304, intelligent port controller 302 may determine whether a change in connectivity has occurred, and based upon the value detected, may determine the nature of the change in cable connectivity to the port. This information may be reported to patch panel controller 304 and may be reported by patch panel controller 304 to Network Management System 308 via a network management port module 306 that supports connectivity between the power patch panel 300 and a remote Network Management System 308 via a network connection.

Although only a single exemplary power patch panel port 301 is represented in FIG. 3, power patch panel 300 may include any number of ports 301. Each port may be equipped with cable connectivity detection capabilities as described above.

Figure 4:
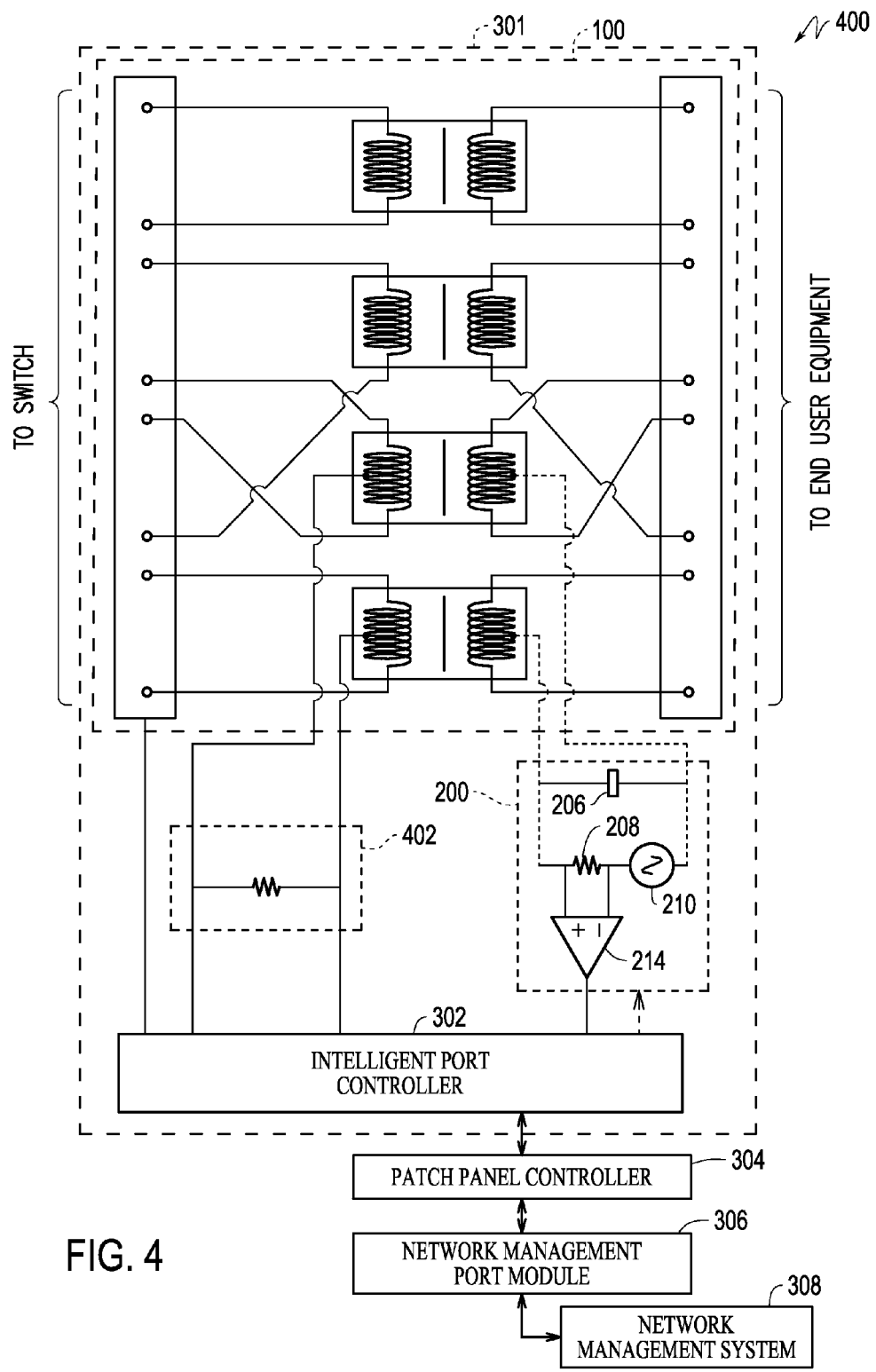
FIG. 4 is a schematic diagram of an exemplary power patch panel that supports guided MAC operations and is capable of monitoring the presence, or absence, of a physical cable connection to a port using in-band connection monitoring techniques and Power-Over-Ethernet (POE) based detection techniques.

FIG. 4 presents a second exemplary power patch panel embodiment. As shown in FIG. 4, physical cable connectivity detection in the port is not limited to common mode detection techniques (i.e., the use of a common mode detection circuit as described, above, with respect to FIGS. 2 and 3). As described above, any number of physical cable detection techniques may be used. For example, physical cable detection techniques may include the use of standard or proprietary POE detection techniques, physical detection techniques such as mechanical detents, magnetic detents, optical detectors or other mechanical/physical techniques and/or the common mode of detection techniques described above with respect to FIGS. 2 and 3.

For example, FIG. 4 shows a representative circuit 402 that may be used to detect a connection to a device that supports POE using standard POE detection techniques. Intelligent port controller 302 may monitor any number of circuits used to support the variety of physical cable detection techniques as described above, and may report the results to patch panel controller 304. Patch panel controller 304 may then report changes in cable connectivity to a Network Management System via network management port module 306.

It will be appreciated that the exemplary embodiments described above and illustrated in the drawings represent only a few of the many ways of implementing a power patch panel according to the present invention for use in managing MAC operations. The present invention is not limited to use within any specific network cable infrastructure configuration, but may be applied to any deployed network infrastructure that includes use of the described power patch panel.

The power patch panel may be implemented in any number of hardware and software modules and is not limited to any specific hardware/software module architecture. Each power patch panel module may be implemented in any number of ways and is not limited in implementation to execute process flows precisely as described above.

It is to be understood that various functions of the power patch panel methods and apparatus may be distributed in any manner among any quantity (e.g., one or more) of hardware and/or software modules or units, computer or processing systems or circuitry.

A power patch panel that supports guided MAC operations may support patching of any type of network cabling, including but not limited to copper and/or optical fiber cabling. Port connections on the face plate of a power patch panel and/or a power patch panel network connection port may support any type of cable and cable connector, including but not limited to RJ-45-based connectors and optical fiber connectors. Port connections on the rear plate of a power patch panel may support any type of cable and cable connector, including but not limited to punch-down ports, RJ-45 ports, optical fiber connections, etc.

A power patch panel device may connect to a network through any type of network connection, either directly or via an indirect, or shared, connection.

Network Management System processes associated with the power patch panel patch guided MAC capability may be integrated within a stand-alone system or may execute separately and be coupled to any number of devices, workstation computers, server computers or data storage devices via any communication medium (e.g., network, modem, direct connection, etc.). The Network Management System processes associated with the power patch panel guided MAC capability can be implemented by any quantity of devices and/or any quantity of personal or other type of computers or processing systems (e.g., IBM-compatible, Apple, Macintosh, laptop, palm pilot, microprocessor, etc.). The computer system may include any commercially available operating system (e.g., Windows, OS/2, Unix, Linux, DOS, etc.), any commercially available and/or custom software (e.g., communication software, traffic analysis software, etc.) and any types of input/output devices (e.g., keyboard, mouse, probes, I/O port, etc.).

Control software, or firmware, for the power patch panel and Network Management System software associated with the power patch panel guided MAC capability may be implemented in any desired computer language, and may be developed by one of ordinary skill in the computer and/or programming arts based on the functional description contained herein and the flow charts illustrated in the drawings. For example, in one exemplary embodiment the power patch panel guided MAC capability may be written using the C++ programming language. However, the present invention is not limited to being implemented in any specific programming language. The various modules and data sets may be stored in any quantity or types of file, data or database structures. Moreover, the software associated with the power patch panel guided MAC capability may be distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

The format and structure of internal information structures used to hold intermediate information in support of the power patch panel guided MAC capability, and network cable management with respect to devices other than the power patch panel, may include any and all structures and fields and are not limited to files, arrays, matrices, status and control booleans/variables.

The Network Management System used to support the power patch panel guided MAC capability software may be installed and executed on a computer system in any conventional or other manner (e.g., an install program, copying files, entering an execute command, etc.). The functions associated with the Network Management System may be performed on any quantity of computers or other processing systems. Further, the specific functions may be assigned to one or more of the computer systems in any desired fashion.

The power patch panel guided MAC capability may accommodate any quantity and any type of data set files and/or databases or other structures containing stored data sets, measured data sets and/or residual data sets in any desired format (e.g., ASCII, plain text, any word processor or other application format, etc.).

Power patch panel guided MAC capability output (e.g., guided MAC instructions and/or secondary reports) may be presented to the user (e.g., from the power patch panel, from via the Network Management System, etc.) in any manner using alphanumeric and/or visual presentation formats. Power patch panel MAC connection data may be presented in either alphanumeric or visual form and can be processed by the power patch panel and/or Network Management System in any manner and/or using any number of threshold values and/or rule sets.

Further, any references herein to software performing various functions generally refer to computer systems or processors performing those functions under software control. The computer system may alternatively be implemented by hardware or other processing circuitry. The various functions of the power patch panel guided MAC capability may be distributed in any manner among any quantity (e.g., one or more) of hardware and/or software modules or units, computers or processing systems or circuitry. The computer or processing systems may be disposed locally or remotely of each other and communicate via any suitable communication medium (e.g., LAN, WAN, Intranet, Internet, hardwire, modem connection, wireless, etc.). The software and/or processes described above may be modified in any manner that accomplishes the functions described herein.

Signal source 210 in exemplary detection circuit 200, as described with respect to FIGS. 2-4, above, may be optional. For example, detection circuit 200 may be passive in nature and detect changes in voltage across resistor 208 in response to signals applied by external sources upon connection of a cable to one of either cable interconnect 102 and/or cable interconnect 104. However, in order to provide analysis circuit/processor 216 with the ability to proactively (i.e., at it's own initiative) generate and record baseline and subsequent voltage readings in support of cable detection operations, inclusion of signal source 210, which may be controlled by analysis circuit/processor 216, is preferred.

Although cable interconnect 102 in FIG. 1 is indicated as being connected by a cable to a switch and cable interconnect 104 is indicated in FIG. 1 as being connected to end user equipment, such designations are exemplary only. Cable interconnects 102 and 104, as described above, may be configured to support any type of cable interconnect as well as any type of cable terminator (e.g., RJ-45, punch down block, etc.). Further, the cable supported by the respective cable interconnects may be connected to any type of network device (e.g., switch, communication switch, hub, cross-connect patch panel, end-user equipment, etc.).

From the foregoing description, it will be appreciated that a power patch panel and method of managing MAC operations using a power patch panel are disclosed. The described approach is compatible with use of the power patch panel in either an interconnect, or a cross-connect configuration.

While a power patch panel and method of managing cable MAC operations are disclosed, any modifications, variations and changes within the skill of one of ordinary skill in the art fall within the scope of the present invention. Although specific terms are employed herein, they are used in their ordinary and accustomed manner only, unless expressly defined differently herein, and not for purposes of limitation.

What is claimed is:

1. A patch panel port configured to support a connection between a first cable with a first and second wire pair at a first cable interconnect to a second cable with a first and second wire pair at a second cable interconnect comprising:
   a first transformer with first and second coils;
   a second transformer with first and second coils, wherein the first coil of the first transformer is electrically coupled to the first wire pair of the first cable at the first cable interconnect, the first coil of the second transformer is electrically coupled to the second wire pair of the first cable at the first cable interconnect, the second coil of the first transformer is electrically coupled to the first pair of the second cable at the second cable interconnect, and the second coil of the second transformer is electrically coupled to the second wire pair of the second cable at the second cable interconnect; and
   cable detection circuitry electrically coupled to a center-tap of the first coil of the first transformer and a center-tap of the first coil of the second transformer.

2. The patch panel port of claim 1 wherein the detection circuitry comprises a signal source, a resistor, and a frequency dependent impedance, wherein the signal source is in series with the resistor and wherein the frequency dependent impedance is in parallel with the signal source and resistor.

3. The patch panel port of claim 2 wherein the detection circuitry further comprises an operational amplifier in parallel with the resistor.

4. The patch panel port of claim 3 wherein an analysis circuit is connected to the operational amplifier.

5. The patch panel port of claim 4 wherein the analysis circuit is an intelligent port controller.

6. The patch panel of claim 5 further comprising a power-over-Ethernet connectivity detection circuit connected to a center-tap of the second coil of the first transformer and a center-tap of the second coil of the second transformer.

7. A communication system comprising:
   a network management system;
   a patch panel, the patch panel comprising a patch panel port configured to support a connection between a first cable with a first and second wire pair at a first cable interconnect to a second cable with a first and second wire pair at a second cable interconnect;
   a first transformer with first and second coils contained within the patch panel port;
   a second transformer with first and second coils contained within the patch panel port, wherein the first coil of the first transformer is electrically coupled to the first wire pair of the first cable at the first cable interconnect, the first coil of the second transformer is electrically coupled to the second wire pair of the first cable at the first cable interconnect, the second coil of the first transformer is electrically coupled to the first pair of the second cable at the second cable interconnect, and the second coil of the second transformer is electrically coupled to the second wire pair of the second cable at the second cable interconnect; and
   cable detection circuitry electrically coupled to a center-tap of the first coil of the first transformer and a center-tap of the first coil of the second transformer, wherein the cable detection circuitry is configured to communicate with the network management system.

8. The communication system of claim 7 wherein the detection circuitry comprises a signal source, a resistor, and a frequency dependent impedance, wherein the signal source is in series with the resistor and wherein the frequency dependent impedance is in parallel with the signal source and resistor.

9. The communication system of claim 8 wherein the detection circuitry further comprises an operational amplifier in parallel with the resistor.

10. The communication system of claim 9 wherein an analysis circuit is connected to the operational amplifier.

11. The communication system of claim 10 wherein the analysis circuit is an intelligent port controller.

12. The communication system of claim 11 further comprising a power-over-Ethernet connectivity detection circuit connected to a center-tap of the second coil of the first transformer and a center-tap of the second coil of the second transformer.

13. The communication system of claim 12 wherein the intelligent port controller is configured to communicate with the network management system via a patch panel controller.

14. The communication system of claim 13 wherein the patch panel controller is configured to communicate with the network management system via a network management port module.

* * * * *